April 8, 1952 — W. H. BARKAS ET AL — 2,591,666
INTERFEROMETER GAUGE
Filed Oct. 20, 1948 — 4 Sheets-Sheet 1

INVENTOR.
WALTER H. BARKAS
WILLARD E. BUCK
BY
ATTORNEY

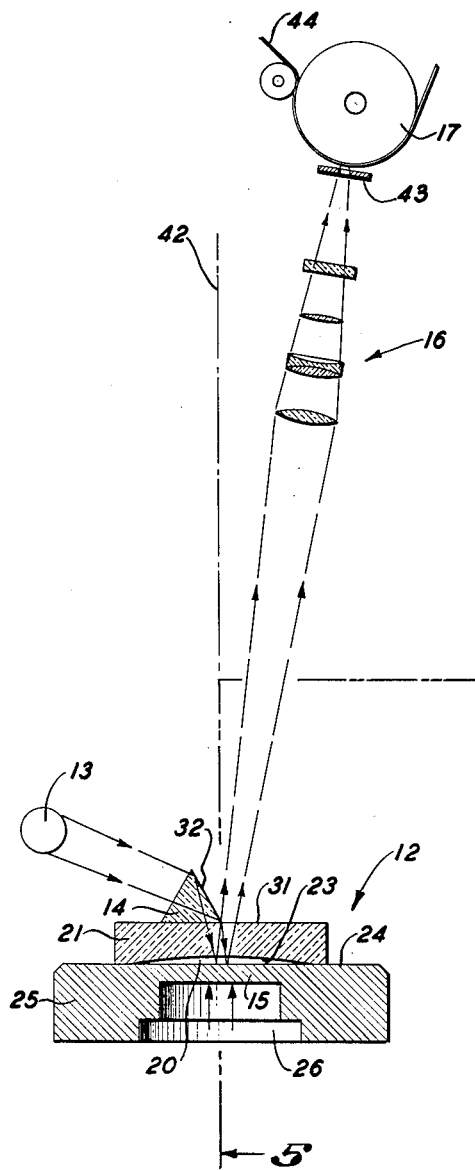
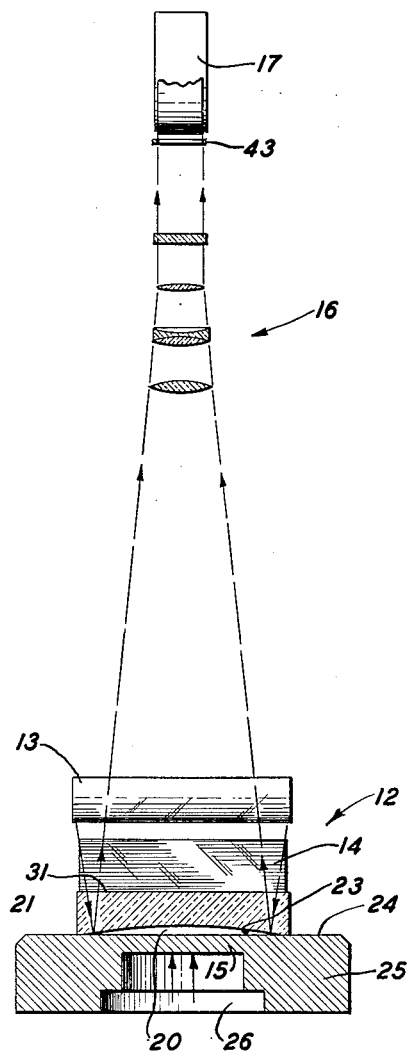

April 8, 1952 W. H. BARKAS ET AL 2,591,666
INTERFEROMETER GAUGE
Filed Oct. 20, 1948 4 Sheets-Sheet 3

INVENTOR.
WALTER H. BARKAS
WILLARD E. BUCK
BY
ATTORNEY

April 8, 1952 W. H. BARKAS ET AL 2,591,666
INTERFEROMETER GAUGE
Filed Oct. 20, 1948 4 Sheets-Sheet 4

INVENTOR.
WALTER H. BARKAS
WILLARD E. BUCK
BY M. O. Hayes

ATTORNEY

Patented Apr. 8, 1952

2,591,666

UNITED STATES PATENT OFFICE 2,591,666

INTERFEROMETER GAUGE

Walter H. Barkas, Menlo Park, and Willard E. Buck, Inyokern, Calif.

Application October 20, 1948, Serial No. 55,522

7 Claims. (Cl. 88—14)

(Granted under the act of March 3, 1883, as amended April 30, 1928; 370 O. G. 757)

This invention relates to interferometer gages for measuring and recording minute changes in displacement which may occur at a very high rate and for measuring and recording rates of change of such displacement.

When it is necessary to measure precisely minute changes in displacement occurring at a very high rate, it is necessary to have an instrument which has a high speed of response so that it will record almost instantaneously the displacement changes. One such application for an instrument of this nature is in the measurement of rapidly changing pressures which are detected primarily by a diaphragm which fluctuates in accordance with the pressure applied thereto. The problem then becomes one of measuring and recording, with extreme precision and with high time resolution, the position of the diaphragm as it moves in and out in response to the pressure applied thereto.

One of the most rapidly responsive types of measuring apparatus is that employing light, inasmuch as the velocity of light is generally much higher than the fluctuation rate of the phenomena to be observed.

It is an object of this invention to provide a light interference type gage for measuring small displacements of a surface, such as the diaphragm.

It is another object of this invention to provide apparatus for measuring minute displacements having high precision and rapid response characteristics.

It is another object of this invention to provide a light interference type of displacement-detecting apparatus in which excellent precision and frequency response characteristics may be enjoyed, not only in the observation and detecting of the displacement, but also in the recording thereof.

It is another object of this invention to construct an interferometer which will have an absolute zero reference point.

It is another object of this invention to provide an apparatus for observing and recording diaphragm deflection in which the response of the observing medium will be substantially linear with respect to the deflection of the diaphragm.

It is another object of this invention to provide an apparatus in which the calibration will hold true for a long period of time, thereby obviating frequent recalibration.

It is a further object of this invention to provide such an instrument in which there is no observable hysteresis within the accuracy of the apparatus.

It is another object of this invention to provide such an instrument which will be portable, compact, and require a minimum number of adjustments.

It is a further object of this invention to provide such an instrument in which the occasional calibrations necessary may be static in character, thereby obviating the work and expense involved in dynamic calibration.

It is a further object of this invention to provide a gage for measuring, observing and recording pressure in which the observation and record is substantially independent of temperature, barometric pressure, humidity, and other variables, except the pressure to be measured.

It is a further object of this invention to provide a gage for measuring, observing, and recording rates of change of physical quantities, said gage having the same desirable properties set forth in the preceding objects of this invention.

Other objects and many of the attendant advantages of this invention will be readily appreciated as the same become better undersood by reference to the following description.

In essence, the instant invention employs the known principle of light interference, exemplified by Newton's rings, to measure minute displacement. The invention embodies basically two members, having opposed faces both of which are at least partially reflective, and which are spaced from each other by a very small distance. The spacing between these two faces varies along the surface of the faces, and is occupied by a transparent compressible medium providing an optical discontinuity at the interface. At least one of the two members is made of material transparent to light, thereby setting up the basic structure needed to establish an interference pattern somewhat similar to Newton's rings. That is to say, moving across the opposed faces, along the variable spacing, there will be, when monochromatic light is directed through the transparent member onto the two faces and reflected therefrom, alternating zones of constructive and destructive interference, producing corresponding light and dark regions. Since the interference is set up basically by virtue of the spacing between the two reflective surfaces, the nature of the alternating zones will depend directly on the relative contour between the two surfaces. When the spacing changes rapidly along the surface, there will be large number of alternate light and dark regions for a given length. Where the spacing varies slowly along the surface, the number of alternating regions will be small for the same length. For a review of the fundamental operation of the Newton ring phenomenon, reference is made to "Fundamentals of Physical Optics," by Jenkins and White, published by McGraw-Hill in 1937.

In accordance with the instant invention, the spaced reflective surfaces are derived from a pair of members, one of which has a concavity in a face thereof, the second member having a face positioned against the face of the first member and over said concavity. In this way an absolute zero reference for measurement is obtained, since it is known that at the edges of the concavity where the faces touch, the spacing is zero, becoming greater across the concavity until the maximum spacing is reached, and returning to the zero point where the two faces touch at the other side of the concavity.

Further in accordance with the instant invention, a light slit-forming member is positioned at some point in the path of the light beam to delimit the beam to a narrow section crossing the faces of the reflective surfaces along the variable spacing. In this way the observing means, in this case a camera, sees only a narrow slit of light, crossed transversely by dark lines, the dark lines representing points of destructive interference, the light spaces in between representing points of constructive interference. In order that all the fringes be observed by the camera, or other detecting apparatus, it is essential that the slit be, in effect, completely filled by the light source. This is preferably accomplished by using a light source of sufficiently large effective area placed sufficiently close to the reflecting faces. In general, the area of the source is larger than that of the slit. This slit is especially suited for recording by the moving film of a camera, since it may be directed onto the camera lens system transversely of the film. Thus, as the film moves past the lens system of the camera, a series of parallel light and dark lines are traced along the length of the film, and, assuming that the light from the slit occupies the full film width, the total number of such lines lying between the edge and the center of the film at any station along the film is proportional to the spacing between the reflective faces at their centers at the time corresponding to that station. As long as the spacing remains unchanged, the number of lines remains unchanged and the lines are parallel. Should the spacing decrease, the number of lines decreases, and during the transient period the lines in the center of the slit move inward, eventually converging and finally disappearing, until the total number of lines is reduced to the steady state value represented by the new spacing condition. A detailed analysis of the production and behavior of the interference pattern is given hereinafter.

Also in accordance with the instant invention, it is preferred to create the narrow slit of light by utilizing the edge of a reflecting surface positioned in the path of the light between the source and the two reflective faces of the interference-pattern-forming members. This reflecting surface, which preferably is constituted by one face of a prism, also has the advantage of allowing the light source to be appreciably offset from a perpendicular line through the two reflective faces. In this manner the fogging effect of extraneous reflecting and transmission, which would result were the light source to be disposed generally along a normal to the faces, is obviated. Were a source not offset from the normal to be used, it would be necessary to place it back of the camera lens and carry it to the reflective faces by means of a light tube in order to avoid fogging of the camera film. Thus it is seen that the use of a prism provides a convenient practical method of disposing a relatively large area light source relatively close to the reflecting faces (required for the reasons hereinbefore discussed).

Inasmuch as the instant apparatus is used, in the embodiment to be described hereinafter, as a means for measuring and recording fluid pressure, the spacing between the reflective faces is made dependent upon fluid pressure by making one of the members in the form of a diaphragm, to one side of which is applied the fluid pressure, the other side constituting the reflective face spaced from the concavity in the face of the other member of the assembly, which is made of transparent material.

A preferred embodiment of the instant invention will now be described in detail in connection with the accompanying drawings, wherein:

Fig. 4 is an over-all sectioned view of the optical system partly schematic but generally accurate and useful in explaining the entire operation of the system;

Fig. 5 is a section taken substantially at right angles with respect to the view of Fig. 4 along the line 5—5;

Figure 11:
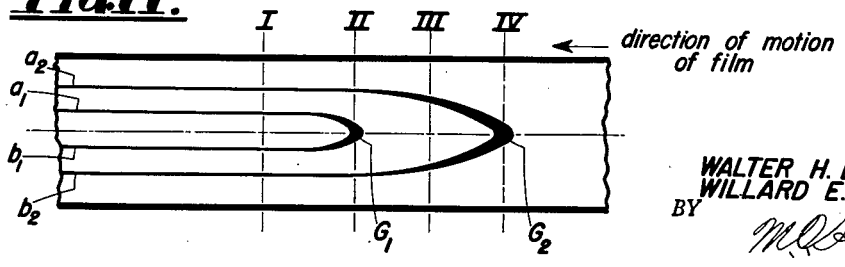
Figure 12:
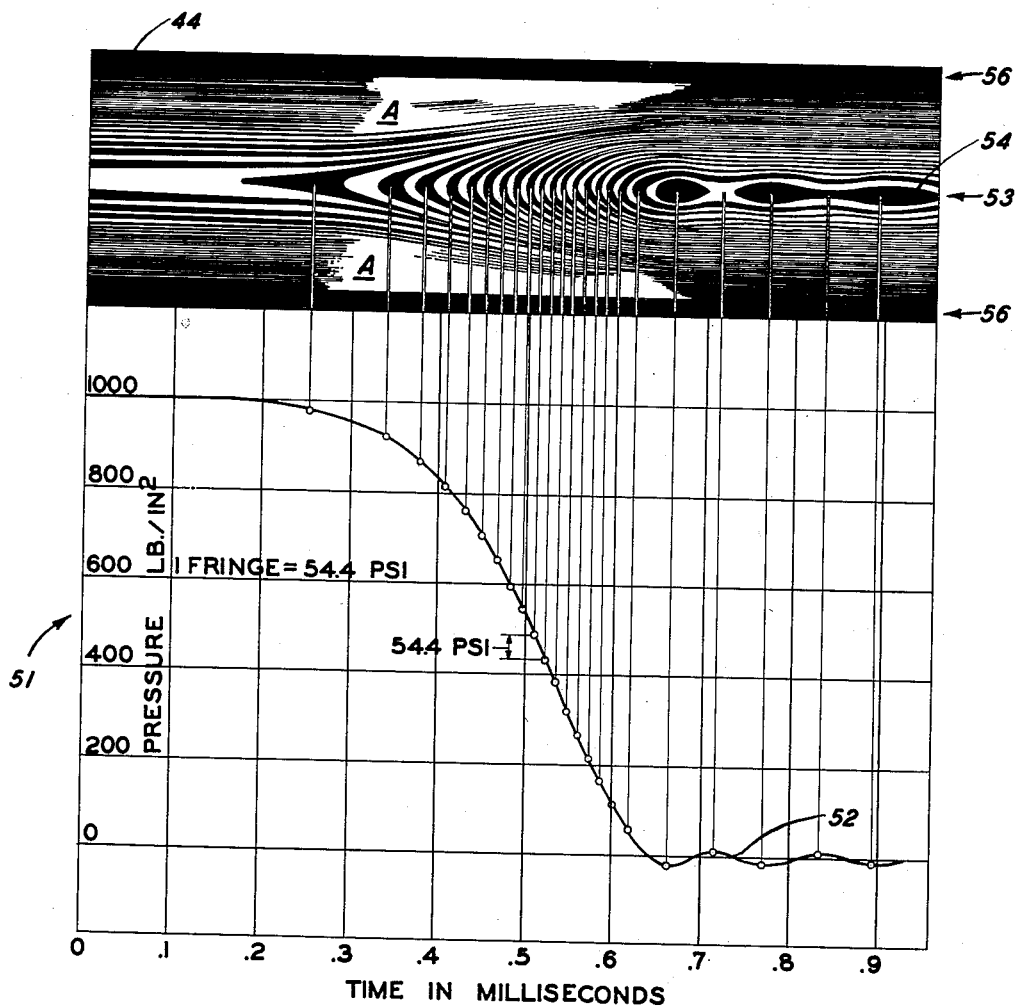

Figs. 8 through 11 are idealized, schematic representations of portions of film showing certain selected parts of interference patterns; and Fig. 12 is a drawing approximating the appearance of an exposed strip of film used in the recordation of a sudden change in pressure, and is accompanied by a graph interpreting the lines shown on the film. Certain portions of the lines on the film are omitted for the sake of clarity.

Figure 1:
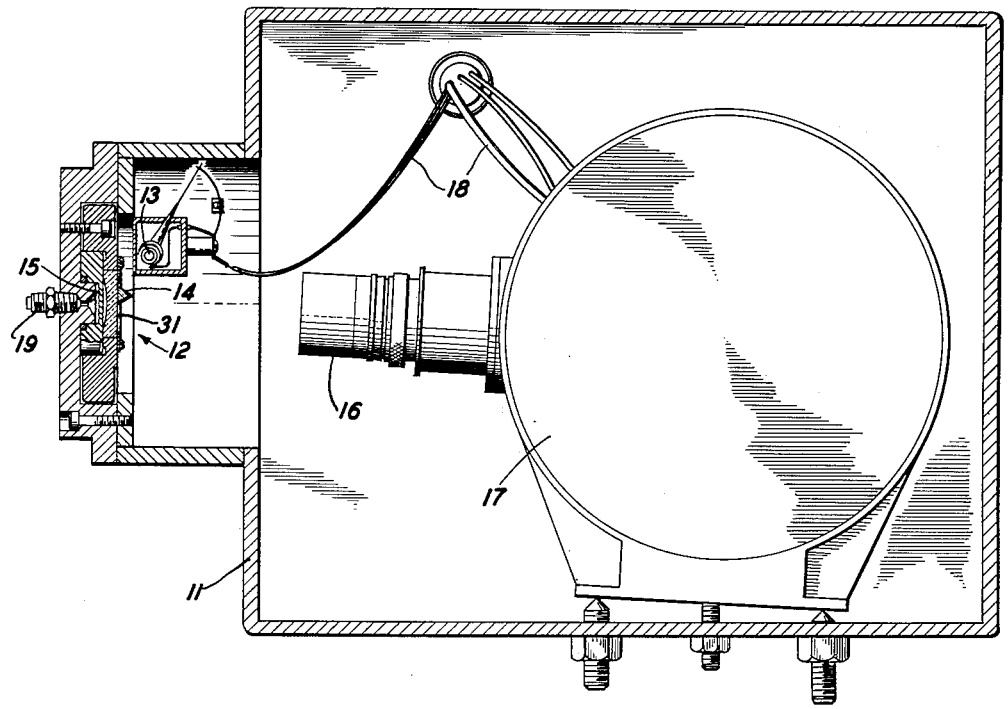
Fig. 1 is a cross-sectional view showing the entire assembly of the apparatus, including the interference-pattern-forming structure and the observing camera.

Referring to Fig. 1, the numeral 11 designates a substantially light tight housing containing in the front panel thereof an assembly 12 forming the basic members which create the interference patterns. A source of light in the form of an elongate tube 13 containing an illuminant such as a mercury arc, easily adaptable to produce high intensity monochromatic light, is mounted near the assembly 12, and directs the light onto a prism 14, from one face of which it is internally reflected onto the face of a reflecting diaphragm 15, and then emerges as a wide flat beam passing back into the lens system 16 of a modified motion picture camera 17. The camera 17 is without shutter mechanism, so that the camera film steadily and continuously records what it sees reflected from the assembly 12. Electrical leads 18 provide power for the light 13 and for the motor of the camera 17, and also transmit timing signals which are recorded on the film. The outer face of the diaphragm 15 is subjected to fluid pressure introduced through a conduit 19. Suitable means are provided for indexing the camera film in synchronism with the occurrence of the pressure phenomenon to be observed.

Figures 2, 3:
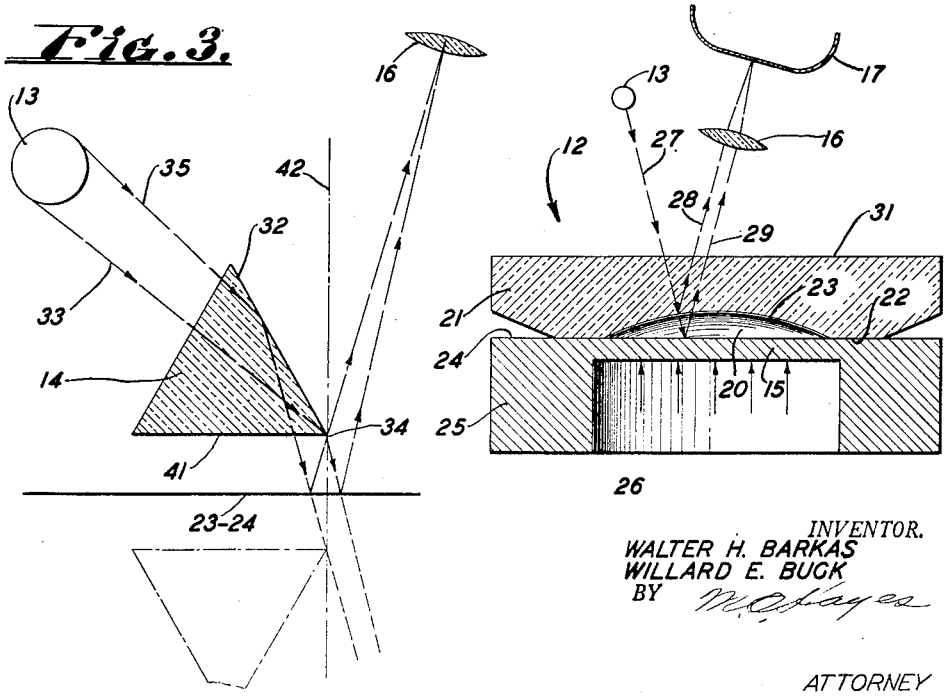
Fig. 2 is a schematic section used to illustrate an operating principle of the invention.
Fig. 3 is another schematic section useful in explaining the slit-forming means employed in the apparatus.

Referring to Fig. 2, the assembly 12 is shown in detail, consisting of a transparent member or plate 21, one face 22 of which is provided with a concavity 20 which creates between the face 23 and the opposing reflective face 24 of a juxtaposed member 25, the progressive variations in spacing that are requisite to give rise to the interference phenomenon constituting the basic principle utilized in the instant invention. The concave face 23 is preferably made spherical, but may, if desired, be cylindrical or of any other suitable configuration.

The member 25 is recessed to form a fluid receiving chamber 26, the wall remaining constituting the diaphragm 15 which moves in and out in response to fluid pressure in the chamber 26, supplied from the conduit 19. The space between the concave face 23 and the flat face 24 of the diaphragm 15 is filled with air or other compressible medium. To insure reflection from the member 25 at the surface 24 where it bounds the compressible medium it is essential that surface 24 be of different optical density than the medium. To insure that the reflection is specular and of high intensity so as to produce the most pronounced effect at the camera the surface 24 of the member 25 should be smooth and shiny. Also the member 25 must be of a material sufficiently strong to withstand the pressures to which it is subjected. In the embodiment shown, the member 25 is preferably fabricated of a ferrous material having an elastic limit sufficiently high as to be unexceeded during use of the instrument. In a preferred embodiment, the member 25 has been made of SAE 4130 heat treated steel, with the surface 24 either highly polished steel or plated with aluminum while the member 21 has been fabricated of fused quartz. Fused quartz has also been used successfully as a material for member 25.

Both of the surfaces 23 and 24 are reflective to light, the former being made partially reflective and partially transmissive by the coating thereon of a thin metallic coat. Thus a ray of light 27 from the light source 13 passing through the member 21, is partially reflected, internally, in the form of a ray 28 at the surface 23, while the rest of the ray passes into the concavity 20 and is reflected at the surface 24 upward in the form of a ray 29, which also passes upwardly through the transparent plate 21. While the Fig. 2 sketch has illustrated the angle between the incident ray 27 and the reflected rays 28 and 29 as being considerable, there is in actual practice only a minute angle between the two. This, taken together with the fact that at all points the angle between surfaces 23 and 24 is very small, results in the rays 28 and 29, being in fact closely enough coincident that they produce interference, by virtue of the difference in ray paths which they have traversed by the time they arrive at the photographic film of the camera 17. If the difference in path length between the ray 28 and the ray 29 is equal approximately to an integral number of whole wave lengths, destructive interference occurs, and a dark zone, i. e. a light (i. e. bright) line is recorded on the (negative) film in the camera. If the total path length between the rays 28 and 29 differs by an odd number of half wave lengths, then constructive interference occurs and a bright region appears, detectable by the (negative) film in the camera 17 as a dark line. Since the difference in path length between the two rays varies along the surfaces 23—24, depending on the spacing between the two surfaces at any particular point, there will be produced an interference phenomenon formed of a series of alternating light and dark lines. In practice the light source 13 emanates a relatively strong spectral line of light at 5461 A°, and, with the diaphragm 15 unstressed, the difference in path length of this light at the center of the assembly 12, i. e. at the maximum depth of the concavity 20, is about 50 wave lengths. That is to say, the maximum depth of the concavity 20 is around .0136 millimeter.

In practice it is preferred to coat the face 23 with a film of reflective metal of just sufficient thickness to divide the light energy between the reflected and refracted light rays in such proportion that the emerging ray 28 will be equal in intensity to the emerging ray 29. In this way the destructive interference will be complete, and the constructive interference will be a maximum, hereby producing greatest contrast in the interference pattern.

It is desired to give a somewhat narrow crosssection to the beam of light represented by the rays 28 and 29. To delimit this beam so that it will be more susceptible of precise recordation by a moving camera film the prism 14 is cemented to the outer face 31 of the member 21, one face 32 (Fig. 3) thereof forming an internally reflecting surface which directs the beam of light from the source 13 substantially normally against the surfaces 23 and 24. While the concavity 20 has been shown quite pronounced in Fig. 2, it will be understood that in practice this concavity is actually almost imperceptible, the exaggerated illustration having been used in Fig. 2 simply to elucidate explanation thereof. Thus, the beam of light which passes through the member 21 is actually substantially normal to both of the faces 23 and 24. The normality of the incident beam is offset just enough to allow the return beam to pass back to the camera 17.

The manner in which the prism 14 provides not only a reflecting surface 32, thereby allowing the source 13 to be offset from the normal, but serves also to determine the slit width, is best illustrated in Fig. 3. As shown therein the lower edge 33 of the beam is limited by incidence upon the edge 34 at the bottom of the reflecting face 32 of the prism 14. Any light below the edge ray 33 of the beam does not strike the reflecting surface 32, and therefore passes through the member 21 at such an angle that when reflected it does not enter the camera. The limiting upper ray 35 of the beam is also limited by the edge 34, but this delimiting occurs after reflection of the beam from the reflective surfaces 23 and 24. It will be readily seen from Fig. 3 that any rays above the edge ray 35 striking the reflective face 32 will, after reflection from the surfaces 23 and 24, not clear the edge 34, but will enter the prism 14 and, being reflected and/or internally reflected thereby, hence will never reach the lens assembly 16. Since the edge 34 may be ground sharp and straight, the edges of the slit through which the light emerges are clean and accurately parallel. In practice, a desirable width for the image of the slit formed on the film by the lens has been found to be about .015 of an inch.

In order to avoid extraneous reflection at the undersurface 41 of the prism 14, the latter is cemented to the upper face 31 of the member 21 by means of Canada balsam, so that virtually no reflection occurs in the passage of light between the two members.

The entire optical system is shown schematically in Fig. 4, from which the advantages accruing from use of the prism 14 are most readily ascertainable. In the absence of the prism, it would be necessary to dispose the light source 13 substantially on the normal line 42. This could not be done between the lens system 16 and the interference pattern assembly 12 because of the extraneous light that would be thrown against the lens system 16. The alternative of placing the light source 14 behind the camera 17 and bringing the rays parallel against the assembly 12 would be accompanied by four disadvantages. In the first place, the rays striking the upper face 31 of the member 21 would be partially reflected into the camera system 16 and produce a general fogging of the film, which would make its interpretation more difficult.

Secondly, the light intensity available at the assembly 12 would also be less.

In the third place, a distant light source of reasonable size would not completely fill the slit to provide an entire section of the interference pattern from the edge to the center of the concavity 20 visible to the camera.

In the fourth place, disposing the light source at a distance from the assembly 12 would result in the production of a beam of parallel rays which, as hereinbefore discussed, would not satisfy the conditions for the production of a satisfactory interference pattern. These conditions require rays converging at the reflecting surfaces because of the point to point variation in the angle between the reflecting surfaces.

The advantage of disposing the light source 13 near the assembly 12, made possible by use of the prism 14, is best seen in the side view, Fig. 5. As shown in this figure, the use of a close source of light permits the source 13 to be elongate in character and disposed parallel to the slit-forming prism 14 thus achieving the results of illuminating at relatively high intensity the reflecting surfaces 23 and 24 from a source sufficiently extended to completely fill the slit as viewed by the camera.

To further control slit width, a second slit-forming member 43 may be disposed between the film 44 and the reflecting surfaces 23—23. Member 43 also preferably includes a monochromatic filter to perfect the monochromatic character of the light reaching the film 44.

*Analysis of interference pattern*

Figure 6:
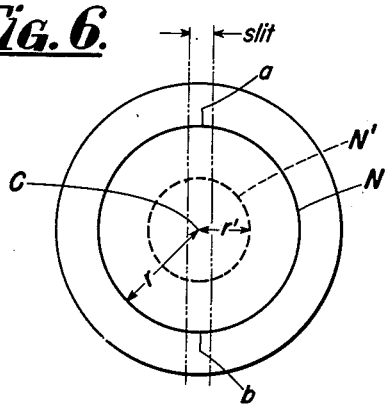
Fig. 6 is a diagrammatic, idealized plan view of the interference-pattern-forming means of the apparatus showing, in effect, only a geometrical representation of a portion of the interference pattern.
Figure 7:
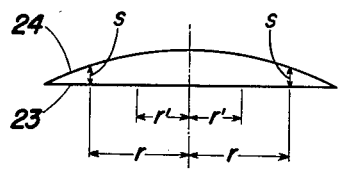
Fig. 7 is a cross-section of the interference-pattern-forming means of the same character as and taken along a diameter of Fig. 6.

Consider a point at a distance $r$ from the center C of the pattern-forming members 21, 25 located at a position where the spacing $s$ between the surfaces 23 and 24 produces constructive interference appearing as a bright spot when the pressure on the diaphragm 15 is say zero. The locus of such points will be a bright circle N of radius $r$ described about the center C of the members 21 and 25. By virtue of the slit-forming apparatus the film is permitted to view only two very small diametrically opposed arcs $a$ and $b$ of this bright ring, shown in Fig. 6 with their lengths exaggerated. If the pressure on the diaphragm 15 remains at zero and the film is caused to move through the camera the arcs (really so small as to be spots) will trace on the film two straight lines (which appear as dark lines on the developed negative) equidistant (by amount $r$) from the center of the film (assuming the slit occupies the whole width of the film) and parallel to its direction of travel.

Figure 8:
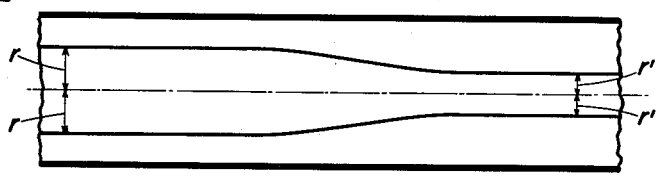
Figure 9:
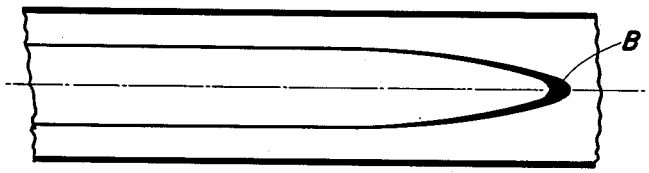
Figure 10:
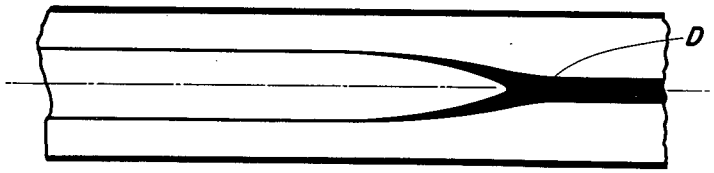

If now a pressure is applied to the diaphragm 15 the diaphragm is deflected toward the member 21 and the locus of points where the spacing between the surfaces 23 and 24 equals $s$ is another smaller circle N', of radius $r'$, still, however, described about the center C if the diaphragm is assumed to deflect uniformly. Thus to the eye watching the circle N during the change in pressure the circle will appear to become smaller. On the film the parallel lines traced by the spots $a$ and $b$ will start to converge during the pressure change. If the pressure becomes constant again at the point where surfaces 23 and 24 are spaced from each other a distance $s'$ at radius $r'$, the lines traced by the spots $a$ and $b$ will cease converging and will again trace parallel lines each spaced from the center of the moving film by a distance $r'$ as shown in Fig. 8. If, however, the pressure on the diaphragm 15 is increased sufficiently the deflection may bring the surfaces 23 and 24 so close together that only at the very center is the distance between them still equal to $s$. At the end of such a pressure change the circle N reduces to such a small size that it finally becomes substantially a dot. Since the upper surface 23 is theoretically gently curved but in effect is somewhat flattened at its center rather than sharply concave, there may be a finite area at the center which remains spaced a distance $s$ from the surface 24 and in this case the dot is of appreciable size and may appear as a blob. During the condensation of the circle N into a blob the arcs $a$ and $b$ trace on the film two lines which converge to an actual junction at the center of the film, as shown in Fig. 9, and appear as dark lines on the developed negative. The blob area B indicates that there is a finite area rather than a point whereat the surfaces 23 and 24 are spaced from each other a distance $s$. If the pressure on the diaphragm remains constant at this value the blob appears on the developed negative as a single broad dark line along the center of the film as at D in Fig. 10.

If the pressure is further increased to the extent that the surface 24 is deflected until the center (and, of course, every other point) of it is no longer distant as much as $s$ from the surface 23 then the blob B disappears entirely.

Under the circumstances when the circle N exists at radius $r$ there also exists a series of similar bright circles $N_1$, $N_2$, $N_3$, etc., concentric to N at radii $r_1$, $r_2$, $r_3$, etc., where the spacing $s_1$, $s_2$, $s_3$, etc., between the surfaces 23 and 24 is in each case given by $$(2n-1)\frac{\lambda}{4}n$$

$n$ being a positive integer. Consequently when the dots $a$ and $b$ produce parallel dark lines on the developed negative each spaced a distance $r$ from the center of the film, the corresponding dots $a_1b_1$, $a_2b_2$, $a_3b_3$, etc., of circles $N_1$, $N_2$, $N_3$, etc., produce similar parallel dark lines spaced from the film centerline distances $r_1$, $r_2$, $r_3$, etc. Likewise as the pressure on the diaphragm 15 increases, the deflection of the surface 24 increases until the maximum spacing at the center between the surfaces 23 and 24 decreases progressively through $s_1$, $s_2$, $s_3$, etc., and concomitantly the pairs of lines formed on the film by $a_1b_1$, $a_2b_2$, $a_3b_3$, etc. each successively converge to a blob and disappear. Thus as the film in Fig. 11 moves from right to left the pair of lines formed by $a_1$ and $b_1$ first converge to a blob $G_1$ at the instant when the station II on the film is exposed to the slit of light from the interference pattern. At the time corresponding to station II the pressure on the diaphragm 15 is just that magnitude necessary to produce a deflection of the diaphragm sufficient to render the spacing at the center between the surfaces 23 and 24 equal to $s_1$. At station III the pressure of the diaphragm 15 has increased so that the spacing between the surfaces 23 and 24 has decreased somewhat below the value of $s_1$ and therefore the condition for constructive interference at the center of the pattern no longer exists and the blob $G_1$ disappears from view. At station IV, corresponding to a short time later, the pressure on the diaphragm 15 has further increased until the spacing at the center between the surfaces 23 and 24 is just equal to $s_2$ thus again establishing the condition for constructive interference at the center of the pattern, this time at a spacing just two quarter wavelengths less than that ($s_1$) obtaining at station II. This condition produces convergence to the blob $G_2$ of the lines formed by dots $a_2$ and $b_2$.

Although, for the sake of clarity, only the two innermost pairs of lines formed by $a_1b_1$ and $a_2b_2$ are shown in Fig. 11, there is, of course, a whole series of such pairs of lines filling the space between the edges of the film and the two pairs of lines shown. The heavy "outline" (upper and lower lines) in Figs. 8–11 represents the tracing on the film of the portion visible to the film of the interference fringe produced at the point of contact around its periphery of surface 24 with surface 23. Progressing from an edge of the pattern toward its center each line represents an increase in the spacing between the surfaces 23 and 24 of two quarter wavelengths. Thus by counting the total number of lines between the edge and the center and multiplying this total by $$2\frac{\lambda}{4}$$

the spacing at the center between the surfaces 23 and 24 is calculated. Algebraically, where T is this total number of lines and S the spacing at the center:

$$S = T \times 2\frac{\lambda}{4}$$

But, assuming (as is generally the actual case) that the deflection of the diaphragm, and hence the spacing S, is proportional to the pressure applied to the diaphragm, then if P is the pressure: $S = K_1 P$ and thus $$P = T \times 2\frac{\lambda}{4} \times \frac{1}{K_1} = KT$$

where $$K = 2\frac{\lambda}{4K_1}$$

To calibrate the device it is sufficient to apply a static pressure of $P_I$ which will produce, for example, the pattern at station I in Fig. 11 and then count the total number of lines, $T_I$, between an edge and the center at station I. The pressure is then increased to $P_{II}$ (corresponding to station II) just sufficient to make one pair of lines $a_1b_1$ converge to a blob and disappear at the center and then at station II the total number of lines between an edge and the center is $T_{II} = T_I - 1$. Thus it is seen that a difference of one line between the totals at the two stations represents a pressure difference of $P_{II} - P_I$, the numerical value of which is determined from the actual measured vaules of these two pressures. Rather than counting the totals of the numbers of lines between an edge and the center at any particular two stations and subtracting one from the other, the pressure difference between them can more readily be calculated by counting the number of blobs $G_1$, $G_2$, etc. (easily observable) between them, realizing that each blob represents one line about to disappear. By multiplying the number of blobs by the measured standard pressure difference corresponding to the disappearance of one line, the pressure difference between the two particular stations results. When a station falls, for example, in the middle of a thick blob the pressure difference is estimated by interpolation.

The interpretation of an actual film represented in Fig. 12 is discussed hereinafter in connection with the discussion of the operation of the apparatus.

*Operation*

In operation, a fluid under pressure is applied through the conduit 19 against the diaphragm 15. The face 24 of the member 25 is thus bulged upwardly a minute amount and tends to lessen the maximum space between the two faces 23 and 24. Thus, the number of interference lines across the slit formed by the light source 13 is decreased. This decrease is noted on the film 44 of the camera 17. During the transient period when the pressure in the chamber 26 is increasing, the lines formed on the film 44 converge inwardly toward the center of the film, and corresponding lines on each side of the film center line eventually meet and disappear, until a new steady state pressure is reached, whereupon the lines become parallel again, the total number of lines being fewer than before the pressure increase.

Fig. 12 shows a sample length of film 44, upon which are traced the lines resulting from a sudden drop in pressure, from 1000 pounds per square inch to zero. Inasmuch as the dimensions of the concavity are known accurately, the number of lines which are created by a particular wavelength of light from the source 13, with the diaphragm 15 unstressed, is known. When looking at the interference pattern either through an eyepiece pointed at the outer face 31 of the member 21 or by substituting a ground glass screen for the film in camera 17, the fringes are completely resolved, i. e. the eye can actually discern each dark fringe (destructive interference), for example, as being separate and distinct from the others. At the outer edges of the fringe system, where the members 21 and 25 are in physical contact (i. e. with zero spacing), the fringe is dark indicating a point of destructive interference. Progressing from the edge toward the center, each successive dark fringe is located at a point where the spacing between the faces 22 and 23 is approximately equal to an integral number of half wave lengths of the light being used. For example, the first dark fringe adjacent the outermost dark fringe will be located at a point where the space between the reflecting surfaces is approximately one half of a wave length while the fifth dark fringe will be found at a point where the separation between the two reflecting surfaces is approximately 2½ wave lengths of the light used. Thus it can be seen that (taking proper account in cases involving a fraction of a fringe at the center) the spacing between the reflecting surfaces at the center can be determined by counting the number of dark fringes between the edge and the center and multiplying that number by ½ the wavelength of the light used. Fine grained film used in the camera 17 will resolve the fringes quite well, although, of course, the fringes constituting areas of destructive interference will appear on the (negative) film as light lines rather than as dark lines such as they appear to the eye looking directly at the face 31. Thus is Fig. 12 an example of such a film, the dark lines represent areas of constructive interference where the reflecting surfaces are spaced from each other approximately an odd number of quarter wavelengths. The figure, being a drawing, of course, is not an exact reproduction of a film and differs therefrom in two major features: (1) the fringes may not appear to be completely visibly resolved as they are on actual film and (2) the two clear areas A are on actual film traversed by fringes but are left blank on the figure for the sake of clarity to aid the eye in following the lead lines to the graph. From the characteristics of the diaphragm 15, there may be calculated how much deflection (or change in spacing between the reflecting surfaces) is produced in the surface 24 for each pound per square inch of pressure in the chamber 26. In the example illustrated in Fig. 12, the instrument was so constructed that each increase of 54.4 pounds per square inch of pressure in the chamber 26 produces an upward deflection at the center of the surface 24 of one-half wavelength. This results in a change in the light path difference between rays reflected through the center by surfaces 23 and 24 of one whole wavelength, i. e. 5461 A°. From this information, and knowing the rate at which the film 44 is moved in the camera 17, the graph 51 may be derived in the manner shown. It will be seen that the graph 51 produces an extremely precise plot of very rapid and extreme pressure changes; in the example illustrated the pressure drops from 1000 p. s. i. to 0 in approximately 0.5 millisecond. It will be manifest that the apparatus of the instant invention shows the minute trailing oscillation 52 which would be virtually undetectable by any known method of measuring such high and rapidly changing pressures.

It will be seen from Fig. 12 that by visual observation of the film 44 one may detect precise and minute nuances of pressure change, since the pattern at the center region 53 of the film is extremely sensitive to small changes of spacing between the surfaces 23 and 24 and consequently to small changes in pressure. There the width of the fringes or interference lines is very large, and by visual interpolation, accuracy considerably better than the 54.4 pounds represented by an integral line may be easily achieved. This is clearly exemplified at the right hand side of the film (Fig. 12) where the trailing oscillation 52 is detectable not by clear breakages between light and dark regions, but by the varying width of the single center line 54.

Although the sensitivity of the instrument is less at the outer edges 56 of the film 44, it is possible in practice actually to count the total number of lines on the film, and thus obtain an absolute measure of the pressure, since the start of the slit is known to be of zero spacing, where the two faces 23 and 24 touch. Once the absolute number of lines on the film has been determined as a function of a given fluid pressure, it is merely necessary to count the changes in lines as they appear and disappear, as shown in Fig. 12, to determine easily and accurately the pressure represented by the new steady state condition pictured on the film.

In practice, apparatus constructed in accordance with the teachings of this invention has been found to have an accuracy of 0.2%, and a flat frequency response up to more than 10,000 cycles per second. The stability of the apparatus has been such as to permit continued use without frequent recalibration. Under static calibration, the apparatus constructed was found to be linear within a range from zero pounds per square inch to 2,000 pounds per square inch. The temperature coefficient was too small to affect the accuracy. It was not necessary to make calibrations before each recording, an initial calibration being found to suffice.

The means for recording the interference fringes in this apparatus need not, of course, be confined to the use of a moving film camera but may be constituted by other apparatus. For example, a photocell combined with a recording oscillograph can be used. One convenient arrangement with such a combination is to provide a relatively stiff diaphragm 15 so designed that the central fringe merely gets wider or narrower over the entire contemplated range of pressures. Then by causing the photocell to view only this central fringe the response of the photocell will vary with the pressure. A photocell can also be adapted to view the entire fringe pattern by masking the photocell with a developed film negative exposed to the light from the pattern at a known standard pressure. The developed negative is placed in the same position in which it was exposed and lies between the assembly 12 and the photocell. Then for small changes in pressure from the known standard pressure the amount of light falling on the photocell is linearly proportional to the pressure change.

Also instead of using a moving film camera for directly recording the interference fringes, other systems can be used as will appear from a consideration of certain features of the invention. One important feature is the production of a narrow slit-like section of the interference pattern taken generally transverse to, and preferably approximately normal to, the direction of the interference fringes. This is accomplished in the illustrated embodiment primarily by means of the prism. As hereinbefore mentioned, the slit-like section consists essentially of a plurality of points or spots each constituting a minute portion of a fringe. It is apparent, then, that the presence and position of these points is related to the magnitude of the displacement to be measured. The motion of the points is related to the rate of change of the displacement, a property which may be observed in a manner hereinafter explained. To record the presence and position of the points, especially during rapid motion, a television type camera or facsimile apparatus can be used which would transmit the picture either by radio or wire ultimately to a film. Also the slit-like section can be scanned by a phototube, the output of which would be recorded on a disc, magnetic wire or tape or the like as a series of pulses, each corresponding to one of the points. These records can be interpreted directly or can be converted into a visual record on film or the like. Although combinations of reflecting-transmitting surfaces other than that shown in the preferred embodiment can be used it is desirable to use a combination having a well-defined reference fringe or zero point and to include this zero point in the slit-like section chosen for observation, this in order to facilitate interpretation of the traces produced by the particular recording medium chosen.

From the foregoing it is seen that, in general, the invention provides for converting changes in an interference pattern which are imperceptible or insensible to an observer because of the rapidity of the changes or because of the confusion in attempting to resolve relatively large segments of fringes of a changing pattern into a perceptible or sensible signal. This is accomplished by, in effect, elongating the time axis and observing either one fringe of relatively small area or relatively minute segments of a plurality of fringes.

Although the specific embodiment of the present invention hereinbefore described is used to measure the pressure causing deflection of the surface 24, the invention can also be used to measure other quantities arranged to produce such a deflection. For example, variation in a magnetic field may be used to produce the deflection of the diaphragm 15 if it is constructed to be a magnetically responsive element such as a current bearing conductor or of ferromagnetic substance. Also the surface 24 may be made part of a member capable of magnetostriction or of a member capable of change in dimension under the influence of an electrical potential change by the converse of the piezoelectric effect. Generally, changes in all of the aforedescribed quantities appear as corresponding changes in the magnitude of deflection of the surface 24 and since the embodiment of the invention shown measures, in effect, changes in magnitude of deflection of the surface 24, it measures changes in these quantities. However, the invention also affords measurements of the rate of change of these quantities appearing usually as the velocity of the moving surface 24. When a film is used the rate can be determined by reference to the slope of the traces but another convenient arrangement for making such measurements of rates is a photocell used to detect the frequency of fringe production at, for example, the center of the fringe pattern. In such an arrangement the photocell is placed to view only the center of the fringe pattern and is connected to drive, for example, an oscillograph or an audio circuit, the frequency of the signals on which would indicate the rate of change of the quantity to be measured.

It will be apparent from the foregoing that certain constructions comprehended within the invention may involve arrangements wherein one of the two optical surfaces undergoes a considerable displacement from the other and need not necessarily be in actual contact therewith. In the case when the optical surfaces are both plane and slightly inclined toward each other and one is translated toward or away from the other, maintaining a constant angle between the surfaces, the photograph of the slit, lying of course, transverse to the fringes, will show fringes disappearing off of one edge of the film at the same rate that new fringes appear at the other edge of the film. This gives a cumulative record of the displacement of one surface relative to the other. In the case where the displacement involves a change of angle between plane optical surfaces, the photograph of the slit will show a number of fringes appearing at one edge of the film different from the number leaving at the other edge. This gives a cumulative record of the rotation of one surface relative to the other. It is apparent, then, that a photograph of the slit can be used to produce a chronological record of a displacement involving simultaneous rotation and translation of one optical surface relative to the other and the analysis of the photograph can be used to determine the exact nature of the displacement.

Obviously many modifications and variations of the present invention are possible in the light of the above teachings. It is therefore to be understood that within the scope of the appended claims the invention may be practised otherwise than as specifically described.

The invention described herein may be manufactured and used by or for the Government of the United States of America for governmental purposes without the payment of any royalties thereon or therefor.

We claim:

1. Apparatus for measuring minute displacement, comprising a transparent member having a concavity in one face thereof, a diaphragm having a reflecting surface positioned against said face over said concavity, a prism mounted to said transparent member opposite said face, said prism having one of its faces disposed at an acute angle with respect to said face, a source of light disposed to direct a beam against said prism face and thence generally normally against said diaphragm surface, and means for observing the beam after reflection from said surface.

2. Apparatus for measuring minute displacement, comprising a transparent member having a concavity in one face thereof, a diaphragm having a reflecting surface positioned against said face over said concavity, a prism mounted to said transparent member opposite said face, said prism having one of its faces disposed at an acute angle with respect to said face, an elongate source of light disposed parallel to said prism to direct a beam against said prism face and thence generally normally against said diaphragm surface, and means including a lens system for observing the beam after reflection from said surface.

3. Apparatus for measuring minute displacement, comprising a transparent member having a concavity in one face thereof, a diaphragm having a reflecting surface positioned against said face over said concavity, a prism mounted to said transparent member opposite said face, said prism having one of its faces disposed at an acute angle with respect to said face, an elongate source of light disposed parallel to said prism to direct a beam against said prism face and thence generally normally against said diaphragm surface, and a camera directed to receive the beam after reflection from said diaphragm surface, said camera having means for steadily moving a film to continuously record the beam.

4. Apparatus for measuring minute displacement, comprising a transparent member having a concavity of spherical surface in one face thereof, a diaphragm having a reflecting surface positioned against said face over said concavity, means for flexing said diaphragm toward and away from said concavity, a prism mounted to said transparent member opposite said face, said prism having one of its faces disposed at an acute angle with respect to said face, an elongate source of light disposed parallel to said prism to direct a beam against said prism face and thence against said diaphragm surface through said transparent member, a camera directed to receive the beam after reflection from said diaphragm surface, said camera having means for steadily moving a film to continuously record the beam, and a member having an elongate slot positioned in the light path between said diaphragm and the camera film.

5. An optical system comprising a member having a transmitting-reflecting surface formed with a concavity; a diaphragm having a reflecting surface positioned against said concavity, said concavity and said diaphragm surface constituting a pair of interference-pattern-forming surfaces; a third reflecting surface adapted to reflect light onto said pattern-forming surfaces to form an interference pattern, the region traversed by light so reflected being filled with a medium optically substantially homogeneous; a light source located to illuminate said pattern-forming surfaces by reflection from said third reflecting surface; and observing means for viewing the image of said light source in said pattern-forming surfaces so located that its field of view of reflections in said pattern-forming surfaces from said third reflecting surface is delimited between, on the one hand, an edge of said third reflecting surface and, on the other hand, the image of said edge in said pattern-forming surfaces, said light source being of such area and so located that its image fills said delimited field of view.

6. The optical system of claim 5 wherein said second reflecting surface is constituted by an internally-reflecting face of a prism.

7. The optical system of claim 6 wherein said concavity is symmetrical about an axis passing through it and said edge intersects said axis at right angles.

WALTER H. BARKAS.
WILLARD E. BUCK.

REFERENCES CITED

The following references are of record in the file of this patent:

UNITED STATES PATENTS

| Number | Name | Date |
|---|---|---|
| 674,951 | Abbe | May 28, 1901 |
| 1,044,502 | Crehore et al. | Nov. 19, 1912 |
| 1,625,625 | Ricker | Apr. 19, 1927 |
| 2,281,280 | Gabor | Apr. 28, 1942 |
| 2,338,981 | Straub | Jan. 11, 1944 |
| 2,359,703 | Wood | Oct. 3, 1944 |
| 2,405,960 | Land | Aug. 20, 1946 |
| 2,425,758 | Saunders | Aug. 19, 1947 |

FOREIGN PATENTS

| Number | Country | Date |
|---|---|---|
| 7,232 | Switzerland | Aug. 20, 1893 |
| 444,248 | France | Aug. 2, 1912 |

OTHER REFERENCES

Jenkins and White, Fundamentals of Physical Optics, 1937, published by McGraw-Hill Book Co., New York city, pages 102, 103. (Copy in Division 7.)

Hardy and Perrin, Principles of Optics, first edition, 1932, McGraw-Hill Book Co., page 577. (Copy in Division 7.)